(12) United States Patent
Epsch et al.

(10) Patent No.: US 6,825,250 B2
(45) Date of Patent: Nov. 30, 2004

(54) PROCESS FOR REDUCING THE AMOUNT OF FLUORINATED SURFACTANT IN AQUEOUS FLUOROPOLYMER DISPERSIONS

(75) Inventors: Rebekka Epsch, Schnaitsee (DE); Klaus Hintzer, Kastl (DE); Gernot Löhr, Burgkirchen (DE); Werner Schwertfeger, Altoetting (DE)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/429,387

(22) Filed: May 5, 2003

(65) Prior Publication Data

US 2003/0220442 A1 Nov. 27, 2003

(30) Foreign Application Priority Data

May 22, 2002 (EP) .......................................... 02100574

(51) Int. Cl.$^7$ ................................................ C08L 1/00
(52) U.S. Cl. ...................... 523/310; 523/332; 524/544; 524/546; 524/458; 525/482
(58) Field of Search ................................ 523/310, 332; 524/544, 546, 458, 482

(56) References Cited

U.S. PATENT DOCUMENTS

| | | | | |
|---|---|---|---|---|
| 4,282,162 A | * | 8/1981 | Kuhls ......................... | 554/193 |
| 4,369,266 A | * | 1/1983 | Kuhls et al. ................ | 523/332 |
| 5,229,480 A | | 7/1993 | Uschold | |
| 5,442,097 A | | 8/1995 | Obermeier et al. | |
| 5,688,884 A | | 11/1997 | Baker et al. | |
| 5,700,859 A | | 12/1997 | Ogura et al. | |
| 5,763,552 A | | 6/1998 | Feiring et al. | |
| 5,804,650 A | | 9/1998 | Tsuda et al. | |
| 5,895,799 A | | 4/1999 | Wu et al. | |
| 5,990,330 A | * | 11/1999 | Sulzbach et al. ........... | 554/202 |
| 6,025,307 A | | 2/2000 | Chittofrati et al. | |
| 6,103,843 A | | 8/2000 | Abusleme et al. | |
| 6,126,849 A | | 10/2000 | Yamana et al. | |
| 6,429,258 B1 | | 8/2002 | Morgan et al. | |
| 6,436,244 B1 | | 8/2002 | Führer et al. | |
| 6,642,415 B1 | * | 11/2003 | Fuhrer et al. ............... | 562/602 |
| 2002/0013438 A1 | | 1/2002 | Grootaert et al. | |
| 2003/0125421 A1 | * | 7/2003 | Bladel et al. ............... | 523/310 |

FOREIGN PATENT DOCUMENTS

| | | |
|---|---|---|
| EP | 0 712 882 A1 | 5/1996 |
| EP | 0 752 432 A2 | 1/1997 |
| EP | 0 816 397 A1 | 1/1998 |
| EP | 1 059 342 A1 | 12/2000 |
| EP | 1 160 258 A1 | 12/2001 |
| EP | 1 323 677 A1 | 7/2003 |
| WO | WO 96/24622 | 8/1996 |
| WO | WO 97/17381 | 5/1997 |
| WO | WO 00/35971 A1 | 6/2000 |
| WO | WO 01/32563 A1 | 5/2001 |

OTHER PUBLICATIONS

Deutscher, Murray P., "Guide to Protein Purification", vol. 182 of"Methods in Enzymology", 1990 edition, Academic Press, pp. 309–317; see p. 314, lines 20–27).*
"Modern Fluoropolymers", edited by John Scheirs, Wiley Science, 1997, pp. 1–69, 223–237, 239–255, 257–270, 301–310, 373–396, 487–505.
"Ullman Encyclopedia of Industrial Chemistry", 5th ed., 1985 vol. A 14, p. 439 ff.
"Non–Ionic Surfactants", M. J. Schick, Marcel Dekker, Inc., New York, 1967, pp. 44–141, 627–682.
"Encyclopedia of Polymer Science and Engineering", John Wiley & Sons, 1985, vol. 8, p. 347.
"Kirk–Othmer, Encyclopedia of Chemical Technology", 3$^{rd}$ Ed., vol. 13, p. 687, 1981.

* cited by examiner

*Primary Examiner*—David W. Wu
*Assistant Examiner*—Henry S. Hu
(74) *Attorney, Agent, or Firm*—Brian E. Szymanski

(57) ABSTRACT

The present invention provides a process of reducing the amount of fluorinated emulsifier in an aqueous fluoropolymer dispersion by contacting the aqueous fluoropolymer dispersion with an anion exchange resin in a non-fixed resin bed, the process comprising:

(a) mixing the aqueous fluoropolymer dispersion with an effective amount of a surfactant so as to stabilize the fluoropolymer dispersion while being contacted with the anion exchange resin;

(b) contacting the aqueous fluoropolyrner dispersion with an anion exchange resin by agitating the aqueous fluoropolymer dispersion with an effective amount of anion exchange resin for a time of less than 4 hours to reduce the amount of fluorinated emulsifier in the aqueous fluoropolymer dispersion to a desired level; and (c) separating the anion exchange resin from the aqueous fluoropolymer dispersion.

12 Claims, No Drawings

PROCESS FOR REDUCING THE AMOUNT OF FLUORINATED SURFACTANT IN AQUEOUS FLUOROPOLYMER DISPERSIONS

CROSS REFERENCE TO RELATED APPLICATION

This application claims priority to European Patent Application No. EP 02100574.5, filed May 22, 2002.

1. Field of the Invention

The present invention relates to a process for reducing the amount of fluorinated surfactant in aqueous fluoropolymer dispersions. In particular, the present invention relates to an economically more feasible process to reduce the amount of fluorinated surfactant.

2. Background of the Invention

Fluoropolymers, i.e. polymers having a fluorinated backbone, have been long known and have been used in a variety of applications because of several desirable properties such as heat resistance, chemical resistance, weatherability, UV-stability etc . . . The various fluoropolymers are for example described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylenetetrafluoroethylene (ETFE) copolymers, terpolymers of tetrafluoroethylene hexafluoropropylene and vinylidene fluoride (THV) and polyvinylidene fluoride polymers (PVDF).

The fluoropolymers may be used to coat substrates to provide desirable properties thereto such as for example chemical resistance, weatherability, water- and oil repellency etc . . . For example aqueous dispersions of fluoropolymer may be used to coat kitchen ware, to impregnate fabric or textile e.g. glass fabric, to coat paper or polymeric substrates. Many of the applications of fluoropolyrners, in particular coating of substrates, require fluoropolymer dispersions of a very high purity. Even very small amounts of contaminants may result in defective coatings.

A frequently used method for producing aqueous dispersions of fluoropolymers involves aqueous emulsion polymerization of one or more fluorinated monomers usually followed by an up concentration step to increase the solids content of the raw dispersion obtained after the emulsion polymerization. The aqueous emulsion polymerization of fluorinated monomers generally involves the use of a fluorinated surfactant. Frequently used fluorinated surfactants include perfluorooctanoic acids and salts thereof, in particular ammonium perfluorooctanoic acid. Further fluorinated surfactants used include perfluoropolyether surfactants such as disclosed in EP 1059342, EP 712882, EP 752432, EP 816397, U.S. Pat. No. 6,025,307, U.S. Pat. No. 6,103,843 and U.S. Pat. No. 6,126,849. Still further surfactants that have been used are disclosed in U.S. Pat. No. 5,229,480, U.S. Pat. No. 5,763,552, U.S. Pat. No. 5,688,884, U.S. Pat. No. 5,700,859, U.S. Pat. No. 5,804,650, U.S. Pat. No. 5,895,799, WO 00/22002 and WO 00/71590.

Most of these fluorinated surfactants have a low molecular weight, i.e. a molecular weight of less than 1000 g/mol. Recently, such low molecular weight fluorinated compounds have raised environmental concerns. For example, perfluoroalkanoic acids are not biodegradable. Furthermore, the fluorinated surfactants are generally expensive compounds. Accordingly, measures have been taken to either completely eliminate the fluorinated low molecular weight surfactants from aqueous dispersion or at least to minimize the amount thereof in an aqueous dispersion. For example, WO 96/24622 and WO 97/17381 disclose an aqueous emulsion polymerization to produce fluoropolyiners whereby the polymerization is carried out without the addition of fluorinated surfactant.

However, most of the aqueous emulsion polymerization processes are still being carried out with the aid of a fluorinated surfactant and there thus continues to be the need to remove or at least reduce the level of fluorinated surfactant in the resulting dispersions. U.S. Pat. No. 4,369,266 discloses a method whereby part of fluorinated surfactant is removed through ultrafiltration. In the latter case, the amount of fluoropolymer solids in the dispersion is increased as well, i.e. the dispersion is upconcentrated while removing fluorinated surfactant The disadvantage of the process of U.S. Pat. No. 4,396,266 is that considerable amounts of the fluorinated surfactant leave the dispersion via the permeate of the ultrafiltration. Recovering the surfactant from such permeate is costly.

WO00/35971 further discloses a method in which the amount of fluorinated surfactant is reduced by contacting the fluoropolymer dispersion with an anion exchange resin. According to the preferred embodiment of the process disclosed in this WO publication, a non-ionic surfactant is added to the aqueous dispersion in order to stabilize the dispersion while being in contact with the anion exchange resin. The thus resulting dispersion is then allowed to flow through a column in which the anion exchange resin is fixed which results in the level of fluorinated resin being reduced to 5 ppm or less when the dispersion leaves the column. The effective removal of fluorinated surfactant in this process can probably be attributed to a chromatographic process inherently taking place.

When removing a fluorinated surfactant with an anion exchange resin, a number of disadvantages have been discovered for this column technology. In particular it has been discovered that the column technology does not provide an optimal economic solution to the removal of fluorinated surfactants at an industrial scale where thousands of tons of dispersions having usually an amount of 0.1% by weight based on solids of fluorinated surfactant may need to be treated. In particular, if the same column is to be used for dispersions of a different nature, extensive washing cycles are needed to avoid contamination of one dispersion with another when one wants to switch between dispersions. An alternative would be to use dedicated columns for the different dispersions. Either solution however has associated with it substantial costs.

Additionally, it was observed that the columns are prone to channel formation in the resin bed which results in reduced removal efficiency and eventually leads to a so-called break through of the column when the channels extend substantially throughout the column. Although reversing the flow can close the channels, this affects the availability of the equipment and thus increases cost.

Still further, the column technology is vulnerable for large particles that may be contained in some dispersions and that result from coagulation of smaller particles. Coagulation may be caused during handling of the dispersion and is very difficult to avoid completely. Also, removal of coagulate formed in the dispersion by filtration techniques is difficult and economically not feasible. Because the first layers of the column act as a filter, even small amounts of coagulate in a dispersion may block the column. Reversing flow may unclog the column but of course also affects the cost of the process.

Finally, of most concern is the fact that it has been discovered that the column technology is prone to the formation of abraded anion exchange resin particles, which may contaminate the fluoropolymer dispersion. As already mentioned above, even small amounts of contamination in the resulting fluoropolymer dispersion may make the dispersions useless in a number of typical applications of fluoropolymers, in particular coating applications.

WO 00/35971 in another embodiment also discloses a process in which the aqueous dispersion is stirred under mild conditions with the anion exchange resin. Example 8 of the WO publication suggests that 8 hours are necessary to reduce the level of fluorinated surfactant to below 5 ppm. Moreover, only a twentieth of the anion exchange resin capacity was apparently utilized in that example. The poor loading of the exchange resin in combination with the long treatment makes such a process also highly unattractive from an economical point of view.

Accordingly, it would now be desirable to find a process for removing or reducing fluorinated surfactants in aqueous fluoropolymer dispersions in such a manner that contamination of the dispersion such as for example with abraded anion exchange resin is not likely to occur or is completely avoided. Preferably, the process is economically attractive even when practiced at an industrial scale. Desirably, the process allows for an efficient use of the exchange resin to high loading levels without risk of contamination of the dispersion and without substantial reduction in the efficiency at which the fluorinated surfactant is removed.

SUMMARY OF INVENTION

In one aspect, the present invention provides a process of reducing the amount of fluorinated emulsifier in an aqueous fluoropolymer dispersion by contacting the aqueous fluoropolymer dispersion with an anion exchange resin in a non-fixed resin bed, the process comprising:

(a) mixing the aqueous fluoropolymer dispersion with an effective amount of a surfactant so as to stabilize the fluoropolymer dispersion while being contacted with the anion exchange resin;

(b) contacting the aqueous fluoropolymer dispersion with an anion exchange resin by agitating the aqueous fluoropolymer dispersion with an effective amount of anion exchange resin for a time of less than 4 hours to reduce the amount of fluorinated emulsifier in the aqueous fluoropolymer dispersion to a desired level; and (c) separating the anion exchange resin from the aqueous fluoropolymer dispersion.

By the term "effective amount of anion exchange resin" is meant an amount of exchange resin sufficient to allow reduction of the amount of fluorinated emulsifier, also called fluorinated surfactant, to the desired level in less than 4 hours. The term "non-fixed resin bed" is used as the opposite of "fixed resin bed" where the anion exchange resin is not agitated. Fixed resin bed typically covers the so called column technology in which the resin rests and removal of a substance occurs through a chromatographic process. Thus, in the present invention, the term non-fixed resin bed is used to indicate that the anion exchange resin is agitated such as for example being fluidized, stirred or shaken. Non-fixed resin bed technology is described in Ullmann Encyclopedia of Industrial Chemistry 5$^{th}$ Edition, Vol. A 14, p 439 ff. and in "Ion Exchangers" ed. Konrad Dorfner, Walter De Gruyter, Berlin, New York, 1991 p. 694 ff. These publications also describe fixed resin bed technology which is apparently used in the large majority of applications. Only rarely is use made of non-fixed resin bed technology.

It was found that with the process of the present invention, fluorinated surfactant such as perfluoroalkanoic acids and salts thereof could be effectively removed in short periods of time of for example 30 minutes or less. It was furthermore found that the anion exchange resin can be re-utilized without regeneration up to a high percentage, for example of up to 80% or more of its loading capacity. Also, the process of the invention is more robust in that it is not prone to coagulate which may be present in the dispersion. Thus, the process provides the advantage of being economically more feasible, in particular for practice at industrial scale. Moreover, the process of the invention minimizes or substantially avoids the risk of contamination of the fluoropolymer dispersion with abraded anion exchange resin.

In a further aspect provides a continuous or batch-wise process of reducing the amount of fluorinated emulsifier in an aqueous fluoropolymer dispersion by contacting the aqueous fluoropolymer dispersion with an anion exchange resin in a non-fixed resin bed, the process comprising:

(a) mixing the aqueous fluoropolymer dispersion with an effective amount of a surfactant so as to stabilize the fluoropolymer dispersion while being contacted with the anion exchange resin;

(b) contacting the aqueous fluoropolymer dispersion with the anion exchange resin by agitating the aqueous fluoropolymer dispersion with an effective amount of anion exchange resin and for a time sufficient to reduce the amount of fluorinated emulsifier in the aqueous dispersion to a desired level;

(c) separating the anion exchange resin from the fluoropolymer dispersion;

(d) and re-using in step (b) at least once the anion exchange resin separated in step (c) without having been regenerated.

It was found that in the aforementioned continuous or batch-wise process of the second aspect of the invention, the anion exchange resin can be utilized up to a high percentage of its loading capacity, e.g. up to between 10 and 90% of its theoretic loading capacity, without substantial risk of contamination of the fluoropolymer dispersion with abraded anion exchange resin.

DETAILED DESCRIPTION OF THE INVENTION

The fluoropolymer dispersions from which the fluorinated surfactant is to be removed or in which the amount thereof is to be reduced can originate from any source but are typically fluoropolymer dispersions resulting from an aqueous emulsion polymerization. Typically, the fluoropolymer dispersion will contain at least 10% by weight of fluoropolymer for example between 10 and 70% by weight of fluoropolymer commonly between 20% and 65% by weight. Fluoropolymer dispersions that have a large amount of fluoropolymer such as between 35% and 70% by weight are usually obtained after up concentration.

The fluorinated surfactant in the aqueous fluoropolymer dispersion is typically an anionic fluorinated surfactant as is commonly used in the aqueous emulsion polymerization used to prepare the fluoropolymer Commonly used fluorinated surfactants are non-telogenic and include those that correspond to the formula:

(Y—$R_f$—Z)$_n$-M  (I)

wherein Y represents hydrogen, Cl or F; $R_f$ represents a linear or branched perfluorinated alkylene having 4 to 10 carbon atoms; Z represents COO⁻ or $SO_3^−$, M represents a cation including monovalent and multivalent cations, e.g. an alkali metal ion, an ammonium ion or a calcium ion and n corresponds to the valence of M and typically has a value of 1, 2 or 3.

Representative examples of emulsifiers according to above formula (1) are perfluoroalkanoic acids and salts thereof such as perfluorooctanoic acid and its salts in particular ammonium salts.

The fluorinated surfactant may be present in any amount in the fluoropolymer dispersion that is to be subjected to the method of the present invention. Generally, the aqueous fluoropolymer dispersion will contain the fluorinated surfactant in amounts between 0.05% by weight and 5% based on the total weight of solids in the dispersion, more typically between 0.1% by weight and 2% by weight based on the total weight of solids.

The fluoropolymer contained in the aqueous dispersion includes melt-processible as well as non melt processible fluoropolymers. By the ter m melt-processible is meant a fluoropolymer that has a melt flow index (MEI) sufficiently large such that the polymer can be processed with available polymer melt processing equipment. Examples of non-melt processible fluoropolymers include polytetrafluoroethylene (PTFE) and so-called modified PTFE, which is a polymer of tetrafluoroethylene modified with minor amounts, e.g. 1% or less, of another fluorinated monomer such as for example a perfluorinated vinyl ether. Melt-processible fluoropolymers include the so-called fluorothermoplasts and fluoropolymers for the preparation of fluoroelastomers. Fluorothermoplasts typically have a well defined and pronounced melting point and have a melt flow index of more than 0.1 measured at 265° C. and at a load of 5 kg. Typically, the melting point of a fluorothermoplast will be at least 60° C. with a preferred range being between 100° C. and 290° C. The fluoropolymer of the fluoropolymer dispersion may also be a polymer that upon curing results in a fluoroelastomer. Typically, such fluoropolymers are amorphous fluoropolymers that have no melting point or that have a hardly noticeable melting point. Still further, the fluoropolymer may comprise so-called micro-powder, which is typically a low molecular weight polytetrafluoroethylene. Due to the low molecular weight of the PTFE, micro-powders are melt processible.

Examples of fluoropolymers of the fluoropolymer dispersion include PTFE, modified PTFE, micro-powder, a copolymer of vinylidene fluoride and hexafluoropropylene, a copolymer of tetrafluoroethylene and vinylidene fluoride, a copolymer of tetrafluoroethylene and propylene, a copolymer of tetrafluoroethylene and perfluorovinyl ether, a copolymer of vinylidene fluoride and perfluorovinyl ether, a copolymer of tetrafluoroethylene, ethylene or propylene and perfluorovinyl ether a copolymer of tetrafluoroethylene, hexafluoropropylene and perfluorovinyl ether, a copolymer of tetrafluoroethylene, vinylidene fluoride and hexafluoropropylene and optionally chlorotrifluoroethylene (CTFE), a copolymer of vinylidene fluoride, tetrafluoroethylene and perfluorovinyl ether and a copolymer of tetafluoroethylene, ethylene or propylene, hexafluoropropylene and perfluorovinyl ether.

The particle size of the fluoropolymer in the aqueous fluoropolymer dispersion is typically between 40 nm and 400 nm as such particle sizes (number average diameter) typically result from an emulsion polymerization. Smaller particle sizes are contemplated as well, for example between 5 nm and 20 m, which are typically obtained with micro-emulsion polymerization.

In accordance with the process to remove fluorinated surfactant from the aqueous fluoropolymer dispersion, a surfactant capable of stabilizing the dispersion while being contacted with an anion exchange resin is added to the fluoropolymer dispersion prior to contacting the fluoropolymer dispersion with the anion exchange resin. The surfactant added is typically a non-fluorinated surfactant and is preferably a non-ionic surfactant as disclosed for example in WO 00/35971, in particular those that are commonly used in commercially available aqueous dispersions. However, other non-fluorinated surfactants can be used as well, as long as they are capable of stabilizing the fluoropolymer dispersion, that is as long as they are able of preventing coagulation of the fluoropolymer dispersion while being contacted with the anion exchange resin.

Examples of non-ionic surfactant that can be used include those described in "Non-ionic Surfactants" M. J. Schick, Marcel Dekker, Inc., New York 1967 and in particular those that correspond to the formula:

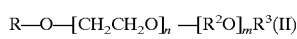

R—O—[$CH_2CH_2O$]$_n$—[$R^2O$]$_m$$R^3$(II)

wherein $R^1$ represents an aromatic or aliphatic hydrocarbon group having at least 8 carbon atoms, $R^2$ represents an alkylene having 3 carbon atoms, $R^3$ represents hydrogen or a $C_1$–$C_3$ alkyl group, n has a value of 0 to 40, m has a value of 0 to 40 and the sum of n+m being at least 2.

It will be understood that in the above formula (II), the units indexed by n and m may appear as blocks or they may be present in an alternating or random configuration.

Examples of non-ionic surfactants according to formula (II) above include alkylphenol oxy ethylates of the formula:

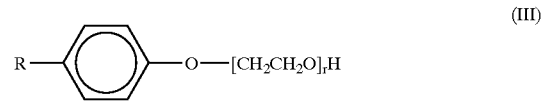

(III)

wherein R is an alkyl group of 4 to 20 carbon atoms and r represents a value of 4 to 20. Examples of surfactants according to formula (III) include ethoxylated p-isooctylphenol commercially available under the brand name TRITON™ such as for example TRITON™ X 100 wherein the number of ethoxy units is about 10.

Still further examples include those in which $R^1$ in the above formula (II) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X 080 from Clariant GmbH. Non-ionic surfactants according to formula (II) in which the hydrophilic part comprises a block-copolymer of ethoxy groups and propoxy groups may be used and well. Such non-ionic surfactants are commercially available from Clariant GmbH under the trade designation GENAPOL® PF 40 and GENAPOL® PF 80.

The stabilizing surfactant is added to the fluoropolymer dispersion in an amount effective to achieve stabilization of the fluoropolymer dispersion while being contacted with the anion exchange resin. The effective amount can be readily determined by one skilled in the art with routine experimentation but is generally between 0.5% by weight and 15% by weight, preferably between 1 and 5% by weight based on the weight of solids in the fluoropolymer dispersion. The addition of the stabilizing surfactant is conveniently added to the fluoropolyiner dispersion under mild agitation, e.g. stirring of the fluoropolymer dispersion. The stability of the fluoropolymer dispersion may be further enhanced by adjusting the pH of the dispersion by adding a base such as ammonia or sodium hydroxide thereto to achieve a pH between 7 and 9. Although adjusting the pH of the dispersion to a pH between 7 and 9 is generally preferred, it is not a requirement of the process and it is thus also possible to contact a stabilized fluoropolymer dispersion with the anion exchange resin without adjustment of the pH. To the fluoropolymer dispersion may further be added compounds to destroy residual initiator such as residual persulfate to suppress corrosion of the process equipment. For example, organic reducing agents such as hydroxylamines, azodicarbonamides and vitamin C may be added.

There is no particular requirement as to the basicity of the anion exchange resin that can be used although it will generally be preferred to use a strong basic anion exchange resin because of the increased effectiveness of the anion exchange resin with increased basicity of the resin. Nevertheless, also an anion exchange resin with a weak basicity or a medium strong basicity can be used in this invention. The terms strong, medium strong and weak basic anion exchange resin are defined in "Encyclopedia of Polymer Science and Engineering", John Wiley & Sons, 1985, Volume 8, page 347 and "Kirk-Othmer", John Wiley & Sons, $3^{rd}$ edition, Volume 13, page 687. Strong basic anion exchange resin typically contain quaternary ammonium groups, medium strong resins usually have tertiary amine groups and weak basic resins usually have secondary amines as the anion exchange functions. Examples of anion exchange resins that are commercially available for use in this invention include AMBERLITE® IRA-402, AMBERJET® 4200, AMBERLITE® IRA-67 and AMBERLITE® IRA-92 all available from Rohm & Haas, PUROLITE® A845 (Purolite GmbH) and LEWATIT® MP-500 (Bayer AG).

Preferably, the anion exchange resin is converted into its OH⁻form prior to use in the process of this invention. This is typically done by treating the resin with an aqueous ammonia or sodium hydroxide solution. The anion exchange resin may be pre-treated with an aqueous solution to the stabilizing surfactant used to stabilize the fluoropolymer dispersion. Thus, if for example a nonionic surfactant is used as the stabilizing surfactant, the anion exchange resin may be pretreated with an aqueous solution of the non-ionic surfactant.

In accordance with the process of removal of fluorinated surfactant, the stabilized fluoropolymer dispersion is contacted with an effective amount of anion exchange resin and for a time sufficient to reduce the level of fluorinated surfactant to a desired level. According to the process, the fluoropolymer dispersion is contacted with the anion exchange resin by agitating the mixture of fluoropolymer dispersion and anion exchange resin. Ways to agitate include shaking a vessel containing the mixture, stirring the mixture in a vessel with a stirrer or rotating the vessel around its axel. The rotation around the axel may be complete or partial and may include alternating the direction of rotation. Rotation of the vessel is generally a convenient way to cause the agitation. When rotation is used, baffles may be included in the vessel. Still further, agitation of the mixture of anion exchange resin and fluoropolymer dispersion may be caused by bubbling a gas through the mixture. Generally the gas used will be an inert gas such as nitrogen or air. A further attractive alternative to cause agitation of the mixture of exchange resin and fluoropolymer dispersion is fluidizing the exchange resin. Fluidization maybe caused by flowing the dispersion through the exchange resin in a vessel whereby the flow of the dispersion causes the exchange resin to swirl. The conditions of agitation are generally selected such that on the one hand, the anion exchange resin is fully contacted with the dispersion, that is the anion exchange resin is completely immersed in the dispersion, and on the other hand the agitation conditions will be sufficiently mild so as to avoid damaging the anion exchange resin and/or causing contamination of the fluoropolymer dispersion.

The amount of exchange resin effective to reduce the level of fluorinated surfactant within 4 hours is typically at least 10% and preferably at least 15% by volume based on the total volume of anion exchange resin and fluoropolymer dispersion. Using an amount of resin of 15% by volume will generally allow reducing the level of fluorinated surfactant to below desired levels which are typically 100 ppm or less, preferably 10 ppm or less and most preferably 5 ppm or less, in a time frame that is economically feasible, particular when practicing the process at industrial scale. Typically, the time necessary to reduce the level of fluorinated surfactant to a desired level in the process of this invention is between 5 minutes and 4 hours. Commonly, a time of 15 minutes to only 1 hour or 2 hours is needed to achieve a desired level of residual fluorinated surfactant.

The time required to achieve the desired level of residual fluorinated surfactant is dependent on the loading degree of the anion exchange resin and the amount of resin that is contacted with the aqueous fluoropolymer dispersion. The contact time will increase with increasing loading degree of the anion exchange resin. Also, shorter contact times will be required when the amount of anion exchange resin is increased. Nevertheless, the amount of anion exchange resin should generally not be larger than 50% by volume based on the total volume of exchange resin and aqueous fluoropolymer dispersion to minimize the risk of contamination of the fluoropolymer dispersion with abraded exchange resin. The required contact time is only to a minor extent dependent on the agitation conditions.

It is a particular interesting finding of the present invention that the anion exchange resin can be re-used in the process without having been regenerated. Thus, it will be possible in the present invention to leverage almost the complete capacity of the anion exchange resin, which thus contributes in finding an economically feasible process that can be used on an industrial scale.

Typically, the present invention allows to use the anion exchange resin up to about 90% of its capacity while still achieving an effective removal of fluorinated emulsifier.

The process of the invention can be practiced in a so-called batch-wise manner or in a continuous manner. In a batch-wise process, a vessel is charged with the anion exchange resin and fluoropolymer dispersion. The mixture in the vessel is then agitated for a time sufficient to reduce the residual fluorinated surfactant to the desired level after which the dispersion and exchange resin are separated, e.g. through filtration. The vessel may then be charged anew with fluoropolymer dispersion and exchange resin, which may be fresh resin or resin that is being re used, and the process is then repeated.

In a continuous process, fluoropolymer dispersion from which fluorinated surfactant needs to be removed is continuously added at one end to an agitating vessel that contains anion exchange resin, and fluoropolymer dispersion having a reduced amount of fluorinated surfactant is withdrawn at another end of the vessel in a continuous fashion. In a continuous process, the equipment will be designed such that the residence time of the dispersion in the vessel is sufficient to reduce the amount of fluorinated surfactant to the desired level. In a particular embodiment of a continuous process, a plurality, e.g. 2 or more, agitating vessels each charged with anion exchange resin may be used. Accordingly, fluoropolymer dispersion may be continuously added and withdrawn from the first vessel. The fluoropolymer dispersion from the first vessel may be fed continuously in the next vessel from which it is continuously withdrawn and this process can be repeated if more than 2 vessels are used. If a plurality of vessels is used, they are typically arranged in a cascading arrangement.

The process of the present invention is an economically feasible process even for practicing at an industrial scale as can be illustrated with the fact that a 1 m³ vessel can handle 5000 m³ of fluoropolymer dispersion, typically resulting from an aqueous emulsion polymerization, per year when filled to a filling degree of 75%, using a volume ratio of anion exchange resin to aqueous fluoropolymer dispersion of 40:60 and loading the anion exchange resin up to 80% of its capacity. Under these conditions, more titan 95% of the fluorinated surfactant is removed from the fluoropolymer dispersion. This can be contrasted with the process as disclosed in example 8 of WO 00/35971 where the use of a 1 m³ vessel would only be able to handle about 400 m³ of dispersion on an annual basis.

The process of the present invention additionally provides the advantage that a changeover from one type of fluoropolymer dispersion to another can be done quickly without risk of cross contamination. For example, the anion-exchange resin in use can be discharged easily and quickly from the vessel and replaced with fresh anion-exchange resin or the anion-exchange resin in use can be washed quickly and effectively in the vessel prior to charging another fluoropolymer dispersion.

Anion exchange resin charged with fluorinated surfactant can be regenerated by eluting the anion exchange resin according to the processes disclosed in for example U.S. Pat. No. 4,282,162, WO 01/32563 and EP 1 069 078 and the fluorinated surfactant may then be recovered from the eluate. The recovered fluorinated surfactant may thereafter be re-used for example in an aqueous emulsion polymerization of one or more fluorinated monomners to produce a fluoropolymer The method of regenerating the anion exchange resin disclosed in U.S. Pat. No. 4,282,162 involves eluting the resin with a mixture of a mineral acid and an organic solvent in which water can be dissolved such as for example methanol. The method of regenerating the anion exchange resin as disclosed in WO 01/32563 involves eluting a weak basic or medium strong basic anion exchange resin with a mixture of ammonia and a water miscible organic solvent that has a boiling point of less titan 150° C. In the method disclosed in EP 1 069 078, the anion exchange resin is eluted with a mixture of water, an ammonium fluoride, ammonium chloride, alkali fluoride or alkali chloride and an organic solvent in which water and the halide can be dissolved. To recover the fluorinated surfactant from the eluate, the process disclosed in U.S. Pat. No. 5,442,097 can be used.

The invention is further illustrated with reference to the following examples, without however the intention to limit the invention thereto.

EXAMPLE 1

Mild agitation conditions were realized by rolling 1 1 glass bottles on a rolling machine at a revolution speed of 40 rpm (rotations per minute). Under such conditions the ion exchange resin was found to be totally immersed in the aqueous fluoropolymer dispersion. The filling degree of the bottles was 75%. The used anion exchange resin was Amberlite® IRA 402 supplied by Rohm and Haas, USA. The anion exchange resin was used in the OH⁻state. An aqueous dispersion of PTFE with a solid content of 22% by weight and a content of 750 ppm of ammonium perfluorooctanoic acid (APFOA) as fluorinated surfactant was used. The fluoropolymer particle size was 210 run. The pH-value of the dispersion was set to 9 by adding ammonia thereto. To the dispersion was added the non-ionic emulsifier Triton™ X 100 supplied by Dow Chemical, USA in an amount of 3.5% by weight based on the total weight of solids.

In this example, the amount of anion exchange resin to dispersion was varied from 15-50 vol % based on total volume of resin and dispersion. After different contact time intervals samples were taken and the actual APFO-content measured. The results are listed in table 1.

TABLE I

| | Vol.-% of exchange resin | | | | |
|---|---|---|---|---|---|
| Contact time [h] | 15 | 25 | 35 | 40 | 50 |
| | APFO-content in ppm | | | | |
| 0.25 | 80 | 60 | 15 | 7 | <5 |
| 0.5 | 26 | 16 | 7 | <5 | <5 |
| 1 | 18 | 6 | <5 | <5 | <5 |
| 2 | 16 | <5 | <5 | <5 | <5 |
| 4 | 11 | <5 | <5 | <5 | <5 |

EXAMPLE 2

Experiments were carried out according to Example 1 but using 3.5% of Gempol® X 080, an alkylpolyethoxyalcohol supplied by Clariant, instead of Triton® X 100. Results are listed in table 2. No discernible change of performance was observed.

TABLE 2

| | Vol.-% of exchange resin | |
|---|---|---|
| Contact time [h] | 15 | 40 |
| | APFO-content in ppm | |
| 0.25 | 75 | 8 |
| 0.5 | 25 | <5 |
| 1 | 17 | <5 |
| 2 | 17 | <5 |
| 4 | 10 | <5 |

EXAMPLE 3

Experiments were carried out according to Example 1. Volume ratio of exchange resin to dispersion was 30:70. The revolution rate was varied from 20 to 80 rpm. Results are listed in table 3. At the lowest revolution rate of 20 rpm the ion exchange resin was not completely immersed in the dispersion. Doubling the revolution rate from 40 to 80 had no discernible influence on the removal rate.

TABLE 3

| Contact time [h] | Rolling Speed Rpm | | |
|---|---|---|---|
| | 20 | 40 | 80 |
| | APFO-content in ppm | | |
| 0.25 | 200 | 50 | 55 |
| 0.5 | 60 | 12 | 11 |
| 1 | 22 | 8 | 7 |
| 2 | 12 | <5 | <5 |
| 4 | 9 | <5 | <5 |

EXAMPLE 4

Experiments were carried out according to Example 1 but using a dispersion of a copolymer of tetrafluorothylene and hexafluoropropene instead of the PTFE dispersion. The dispersion had a solid content of 28% and contained 1500 ppm APFO. Particle size was 150 nm. The pH was adjusted with sodium hydroxide. Rolling speed was 30 rpm. Results are listed in table 4.

TABLE 4

| Contact time [h] | Vol.-% of exchange resin | |
|---|---|---|
| | 15 | 40 |
| | APFO-content in ppm | |
| 0.25 | 140 | 18 |
| 0.5 | 35 | 7 |
| 1 | 15 | <5 |
| 2 | <5 | <5 |
| 4 | <5 | <5 |

EXAMPLE 5

Abrasion Investigation

The dispersion of example 1 was rolled for 14 days at different revolution speeds. Volume ratio of anion exchange resin to dispersion was 40:60. The loading degree was varied. After 14 days the resin was filtered off via a 100 μm sieve. The dispersion was allowed to rest for 2 week and was visually inspected for floating or settled exchange resin. AMBERLITE® IRA 402 is a deep brownish colored anion exchange resin. Traces of resins can thus be readily recognized when present. Results are listed in table 5. In no case was there abraded ion exchange resin detected.

TABLE 5

| | Rolling speed Rpm | | | | | |
|---|---|---|---|---|---|---|
| | 40 | 40 | 40 | 80 | 80 | 80 |
| Loading*) degree of resin | 10 | 50 | 95 | 10 | 50 | 95 |
| observed abrased resin | none | none | none | none | none | none |

*)loading degree was achieved by adding to the dispersion the corresponding amount of APFO

COMPARATIVE EXAMPLE 20 cbm of PTFE dispersion as used in Example 1 was passed through a 50 l ion exchange column. Flow rate was 50 l/h. After each cbm the APFO content was measured. Excerpts of the experimental data are listed in table 6. As can be seen from these data the APFO level was less than 5 ppm for the 1$^{st}$ 5 cbm corresponding to 100 bed volumes. With the next 10 cbm the APFO content steadily increased to 30 pm which is associated with the onset of channel formation. With the next 3 cbm the APFO content reached 60 ppm. After passing through further 2 cbm the APFO level exceeded 400 ppm. Only half of APFO was removed. "The column broke through". The channels arrived at the top of the ion exchange bed.

Reversing the flow direction for 2 hours closed the channels. Another 8 cbm dispersion could be treated resulting in an APFO level of less than 10 ppm. Flow rate was 25 l/h.

TABLE 6

| Volume [cbm] passed through column | 1 | 5 | 10 | 15 | 18 | 20 |
|---|---|---|---|---|---|---|
| APFO-content in the treated dispersion [ppm] | <5 | <5 | 18 | 30 | 55 | 450 |
| loading degree*) of resin [%] | 3.5 | 16 | 33 | 57 | 60 | 65 |

*)Ion exchange capacity of AMBERLITE ®IRA 402: 1.2 mold resin

All these treated dispersions were upconcentrated via ultrafiltration. The content of TRITON® X 100 was thereby adjusted to 5% by weight based on solids. All dispersions were free of coagulum. However, the last lot originating from the last 3 cbm passed through the column showed contamination with abraded ion exchange resin. After 2 weeks a thin layer of brownish liquid was observed floating on top of the dispersion.

What is claimed is:

1. Process of reducing the amount of fluorinated emulsifier in an aqueous fluoropolymer dispersion, comprising:
   (a) mixing the aqueous fluoropolymer dispersion with an effective amount of a surfactant so as to stabilize the fluoropolymer dispersion while being contacted with the anion exchange resin;
   (b) contacting the aqueous fluoropolymer dispersion with an anion exchange resin in a non-fixed resin bed by agitating the aqueous fluoropolymer dispersion with an effective amount of anion exchange resin for a time of less than 4 hours to reduce the amount of fluorinated emulsifier in the aqueous fluoropolymer dispersion;
   (c) separating the anion exchange resin from the aqueous fluoropolymer dispersion.

2. Process according to claim 1 wherein said time is between 5 minutes and 2 hours.

3. Process according to claim 1 wherein said surfactant to stabilize the fluoropolymer dispersion is a non-ionic suffactant.

4. Process according to claim 1 wherein the effective amount of anion exchange resin corresponds to a volume ratio of anion exchange resin to fluoropolymer dispersion of at least 15:85.

5. Process according to claim 1 wherein said surfactant to stabilize the fluoropolymer dispersion is used in an amount of 1 to 5% by weight relative to the total amount of solids in said aqueous fluoropolymer dispersion.

6. Process according to claim 1 wherein said fluoropolymer comprises a fluoropolymer selected from the group consisting of polytetrafluoroethylene, modified polytetrafluoroethylene and thermoplastic melt processible fluoropolymers.

7. Process according to claim 1 wherein said fluorinated emulsifier is a perfluoroalkanoic acid or salt thereof.

8. Process according to claim 1 further comprising
re-using in step (b) at least once the anion exchange resin separated in step (c) without having been regenerated.

9. Process according to claim 8 wherein said anion exchange resin in said step (b) is used in a volume ratio with respect to said aqueous fluoropolymer dispersion of at least 15:85.

10. Process according to claim 9 wherein the volume ratio is between 15:85 and 50:50.

11. Process according to claim 8 wherein said anion exchange resin is re-used to an extent of between 10% and 90% of the anion exchange resins capacity.

12. Process according to claim 8 wherein said surfactant to stabilize the aqueous fluoropolymer dispersion is a non-ionic surfactant.

* * * * *

UNITED STATES PATENT AND TRADEMARK OFFICE
CERTIFICATE OF CORRECTION

PATENT NO. : 6,825,250 B2
DATED : November 30, 2004
INVENTOR(S) : Epsch, Rebekka It is certified that error appears in the above-identified patent and that said Letters Patent is hereby corrected as shown below:

Column 1,
Line 50, "up concentration" should be shown as -- upconcentration --

Column 4,
Line 64, "up concentration" should be shown as -- upconcentration --

Column 5,
Line 4, "(Y_$R_f$-Z)$_n$-M" should be shown as -- (Y-$R_f$-Z)$_n$-M --
Line 26, "ter  m" should be shown as -- term --
Line 27, "(MEI)" should be shown as -- (MFI) --

Column 6,
Line 25, "R-O-[$CH_2CH_2O$]$_n$-[$R^2O$]$_m R^3$" should be shown as
-- $R^1$-O-[$CH_2CH_2O$]$_n$-[$R^2O$]$_m R^3$ --

Column 11,
Line 28, Table 4, Heading under Vol.-% of exchange resin;
"Contact time [h]  15    40" should be shown as -- Contact time [h]  25    40 --
Line 55, Table 5, "Loading*)     should be shown as -- Loading*)
            degree of resin"                          degree of resin % --

Signed and Sealed this

Twenty-sixth Day of April, 2005

JON W. DUDAS
*Director of the United States Patent and Trademark Office*